(12) United States Patent
Morita

(10) Patent No.: US 8,888,631 B2
(45) Date of Patent: Nov. 18, 2014

(54) SPROCKET AND CHAIN TRANSMISSION

(71) Applicant: Tsubakimoto Chain Co., Osaka (JP)

(72) Inventor: Tadashi Morita, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 1 day.

(21) Appl. No.: 13/651,535

(22) Filed: Oct. 15, 2012

(65) Prior Publication Data

US 2013/0109519 A1    May 2, 2013

(30) Foreign Application Priority Data

Oct. 28, 2011    (JP) ................. 2011-237432

(51) Int. Cl.
*F16H 7/00* (2006.01)
*F16H 7/06* (2006.01)
*F16H 55/30* (2006.01)

(52) U.S. Cl.
CPC . *F16H 7/06* (2013.01); *F16H 55/30* (2013.01)
USPC ............................ 474/153; 474/155; 474/156

(58) Field of Classification Search
CPC ........... F16H 55/30; F16H 55/17; F16H 7/06; B62M 9/10; F16G 1/28; F16G 13/04; F16G 13/06
USPC .......................................... 474/152, 153, 156
See application file for complete search history.

(56) References Cited

U.S. PATENT DOCUMENTS

| | | | | | |
|---|---|---|---|---|---|
| 257,445 | A | * | 5/1882 | Lechner | 474/164 |
| 536,813 | A | * | 4/1895 | Macphail et al. | 474/152 |
| 586,991 | A | * | 7/1897 | Curley | 474/156 |
| 591,270 | A | * | 10/1897 | Gauthier | 474/156 |
| 1,482,896 | A | * | 2/1924 | Huntington et al. | 474/152 |
| 2,602,343 | A | * | 7/1952 | Barrett et al. | 474/156 |
| 3,969,947 | A | * | 7/1976 | Martin et al. | 474/156 |
| 4,174,642 | A | * | 11/1979 | Martin et al. | 474/156 |

FOREIGN PATENT DOCUMENTS

JP    7 49101    11/1995

* cited by examiner

*Primary Examiner* — Henry Liu
(74) *Attorney, Agent, or Firm* — Howson & Howson LLP

(57) ABSTRACT

A sprocket comprises a set of standard sprocket teeth, each having a first face width and capable of entry between the inner link plates of a transmission chain and engaging sprocket tooth-engaging driving elements of the chain while restricting side slip of the chain by contact with the inner link plates of the chain. The sprocket also comprises a set of narrow sprocket teeth also capable of engaging driving elements of the chain. Each of the narrow sprocket teeth is narrower than the standard sprocket teeth, and can engage driving elements without contacting the inner link plates of the chain. Contact resistance between the sprocket teeth and the chain is reduced and periodic sounds are reduced, while a stable running path of the chain is maintained.

8 Claims, 9 Drawing Sheets

SPROCKET AND CHAIN TRANSMISSION

CROSS REFERENCE TO RELATED APPLICATIONS

This application claims priority based on Japanese Patent Application No. 2011-237432, filed on Oct. 28, 2011. The disclosure of Japanese Patent Application No. 2011-237432 is herein incorporated by reference.

FIELD OF THE INVENTION

This invention relates to a sprocket for engagement with a chain and a chain transmission using the same. It relates more specifically to a sprocket having both standard sprocket teeth and narrow sprocket teeth arranged on an outer circumferential portion of the sprocket, and to a chain transmission using the sprocket.

BACKGROUND OF THE INVENTION

FIGS. 9, 10A and 10B illustrate a known chain transmission 500 which includes a roller chain 510 in which pairs of inner link plates 511 and pairs of outer link plates 512 are connected in an alternating, overlapping arrangement by connecting pins 513. In the known chain transmission, a sprocket 520, having a plurality of teeth 523, is engaged with the roller chain 510, which is wrapped partway around the sprocket. The teeth of the sprocket all have the same face width, which is only slightly less than the distance between an opposed pair of the inner link plates of the chain. The known chain transmission is described in Japanese Utility Model Publication No. H7-49101.

When a sprocket tooth 523 engages a roller 515 of the roller chain 510, the sprocket tooth enters the space between a pair of the inner link plates 511. Because there is only a small clearance between the tooth and the inner link plates, friction between the sides 523s of a sprocket tooth 523 and inner sides 511s of the inner link plates 511 adversely affects the efficiency of the chain transmission.

If the chain transmission is constructed so that there is a larger clearance between the sides of the sprocket teeth and the inner sides of the link plates, side slip or meandering of the chain 510 can readily occur while the chain transmission is operated. Therefore, as the sprocket teeth 523, all of which have the same face width, are sequentially inserted between a pair of the inner link plates 511, contact between the sprocket teeth and the link plates of the chain generates an undesirable contact sound.

I have conducted intensive research with the objective of addressing the aforementioned problems. This research focused on the conditions under which the outer side surfaces 523s of sprocket teeth 523 having the same face width contact the inner side surfaces 511s of the inner link plates 511 of a roller chain. I found that this type of chain transmission generates a periodic sound the frequency of which is the product of the rate of rotation of the sprocket and the number of sprocket teeth. I addressed the problems on the basis of this finding.

An object of the invention to provide a sprocket and a chain transmission using the same, in which contact resistance between the outer sides of the sprocket teeth and the inner sides of inner plates of a chain is reduced, the periodic sound generated is reduced, and a stable running path of the chain is maintained.

SUMMARY OF THE INVENTION

A sprocket according to the invention, comprises a set of standard sprocket teeth, each having a first face width and capable of entry between opposed, spaced, inner link plates of a transmission chain and engaging sprocket tooth-engaging driving elements of the chain while restricting side slip of the chain by contact with the inner link plates of the chain. The sprocket also comprises a set of narrow sprocket teeth also capable of engaging driving elements of the chain. Each of the narrow sprocket teeth has a face width narrower than the face width of the standard sprocket teeth, whereby the narrow sprocket teeth can engage driving elements without contacting the inner link plates of the chain.

Engagement of the standard sprocket teeth with the inner link plates of the chain restricts side slip of the chain, and maintains stable chain travel by preventing the chain from sliding widthwise or traveling in a slanted path. Moreover, since the sprocket includes a set of narrow sprocket teeth that engage the chain without contacting the inner link plates, the number of contacts between the outer sides of the standard sprocket teeth and the inner sides of the inner link plates for each rotation of the sprocket is decreased by the number of the narrow sprocket teeth on the perimeter of the sprocket. Thus, it becomes possible to reduce the contact resistance and thereby increase the efficiency of the chain transmission, and to reduce the frequency of the periodic sound generated by contact between the outer sides of the standard sprocket teeth and the inner sides of the inner link plates.

In one embodiment, the standard sprocket teeth and the narrow sprocket teeth are disposed in an alternating pattern on the perimeter of the sprocket. In this embodiment, the number of contacts between the standard sprocket teeth and the inner link plates is reduced by one half, and the frequency of the periodic sound caused by contacts between the standard sprocket teeth and the inner link plates is also reduced by one half as is the total energy of the periodic sound.

In another embodiment, adjacent pairs of standard sprocket teeth are disposed in an alternating pattern with individual narrow sprocket teeth on the perimeter of the sprocket. In this embodiment, the number of contacts between the sides of the standard sprocket teeth and the inner link plates of the chain is reduced by one-third. The frequency of the periodic sound includes several components, and the total energy of the periodic sound is also reduced by approximately one-third.

In still another embodiment, the standard sprocket teeth and the narrow sprocket teeth are disposed in a random pattern on the perimeter of the sprocket. In this embodiment, the number of contacts between the sides of the standard sprocket teeth and the inner link plates of the chain is also reduced, the total sound energy is reduced, and the peaks of the sound caused by contact between the standard sprocket teeth and the inner link plates are distributed so that the sound generated at any particular frequency becomes less noticeable.

In another aspect, the invention can be defined as a chain transmission, comprising a chain, and at least one driving sprocket and at least one driven sprocket engaged with the chain in driving and driven relationship, respectively. The chain comprises pairs of opposed inner link plates and pairs of opposed outer link plates, connecting pins connecting the pairs of link plates in alternating, overlapping relationship, and a set of sprocket tooth-contacting driving elements, each surrounding one of the connecting pins. At least one of the sprockets is composed of a set of standard sprocket teeth and a set of narrow sprocket teeth as defined above. Here, the same advantages as mentioned above are achieved.

DETAILED DESCRIPTION OF THE PREFERRED EMBODIMENTS

Figure 1:
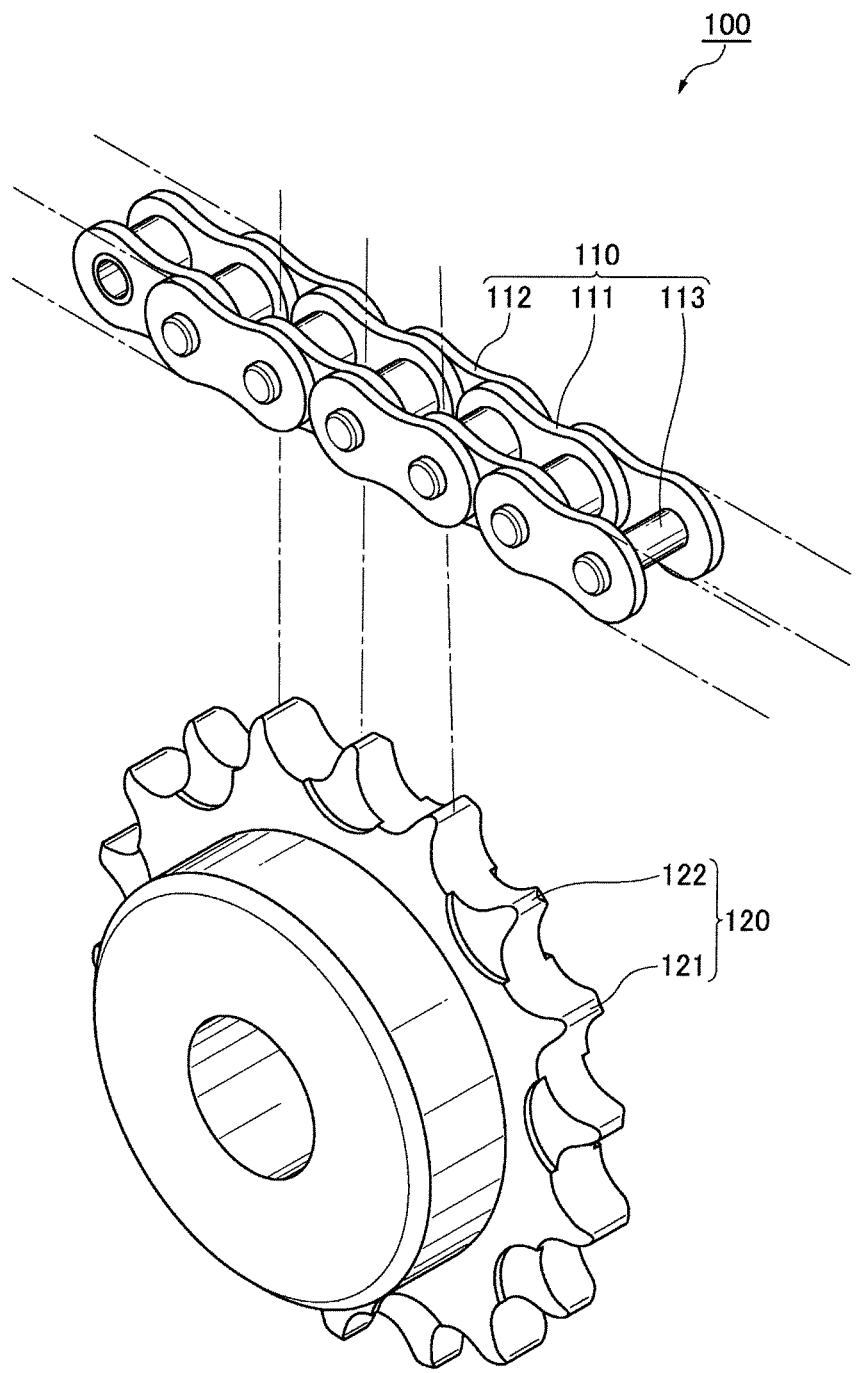
FIG. 1 is a perspective view of a portion of a roller chain, and a sprocket, in a chain transmission according to first embodiment of the invention.

As shown in FIG. 1, a chain transmission 100 according to a first embodiment of the invention includes a roller chain 110 in which pairs of opposed inner link plates 111 are arranged in alternating, overlapping, relationship with pairs of outer link plates 112, and connected in articulating relationship with the outer link plates by connecting pins 113. FIG. 1 also shows a sprocket 120 for engagement with the roller chain 110 in driving or driven relationship. The sprocket has a set 120 of teeth, consisting of two different kinds of teeth, standard teeth 121 and narrow teeth 122. The term "standard teeth" refers to teeth corresponding to those of a conventional sprocket designed for engagement with the particular roller chain being utilized. The clearance between the outer faces of the standard teeth and the inner link plates of the chain is small, and such that frictional contact takes place as the teeth of the sprocket enter the space between a pair of inner link plates.

Figure 2:
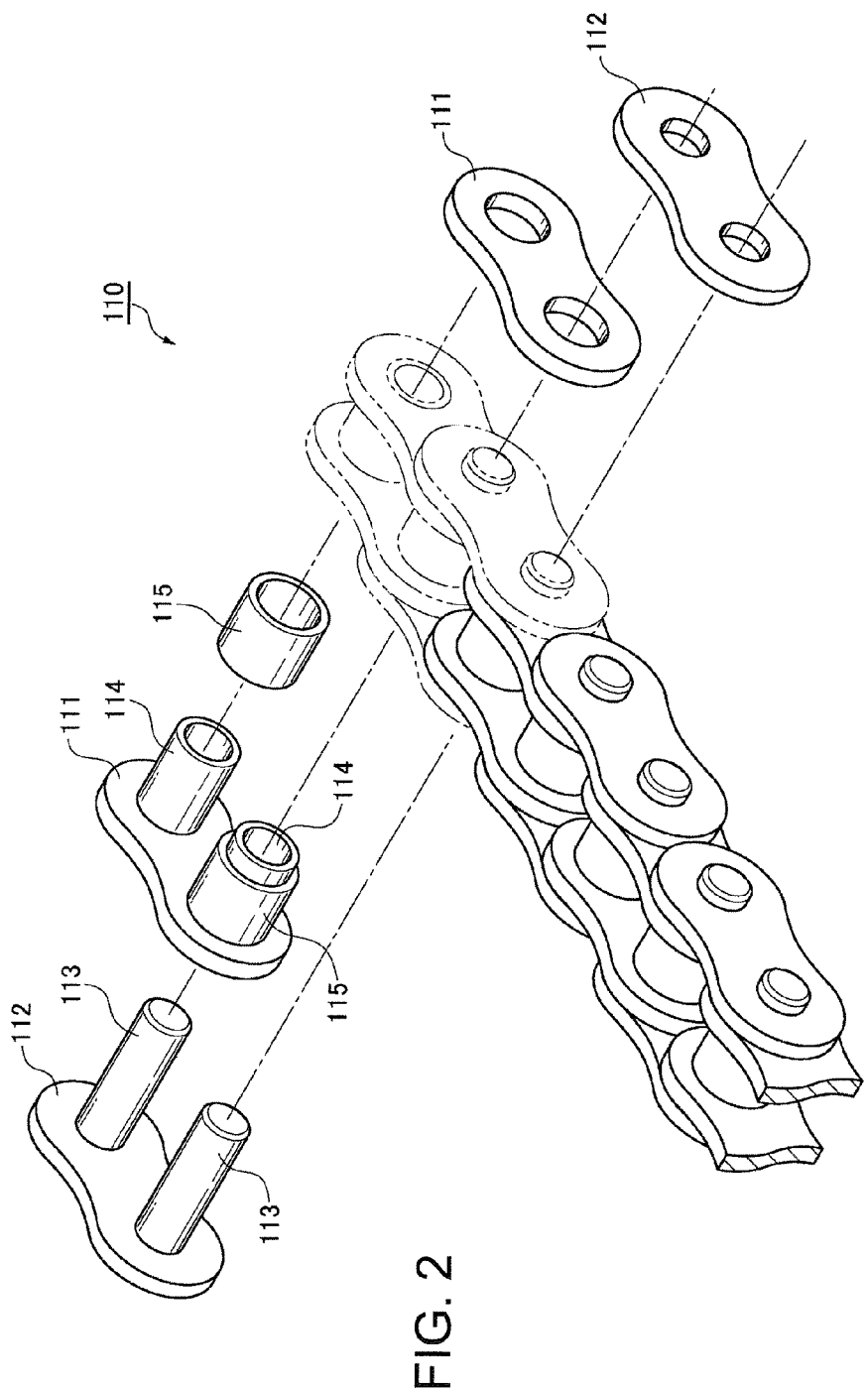
FIG. 2 is an exploded view of the roller chain shown in FIG. 1.

As shown in FIG. 2, the aforementioned roller chain 110 includes a pair of left and right inner link plates 111, a bushing 114 press-fit into the inner link plates 111, a connecting pin 113 extending through, and rotatable in, the bushing 114, a pair of left and right outer link plates 112 into which the connecting pin 113 is press-fit, and a roller 114 loosely rotatable on the bushing 114.

Figure 3:
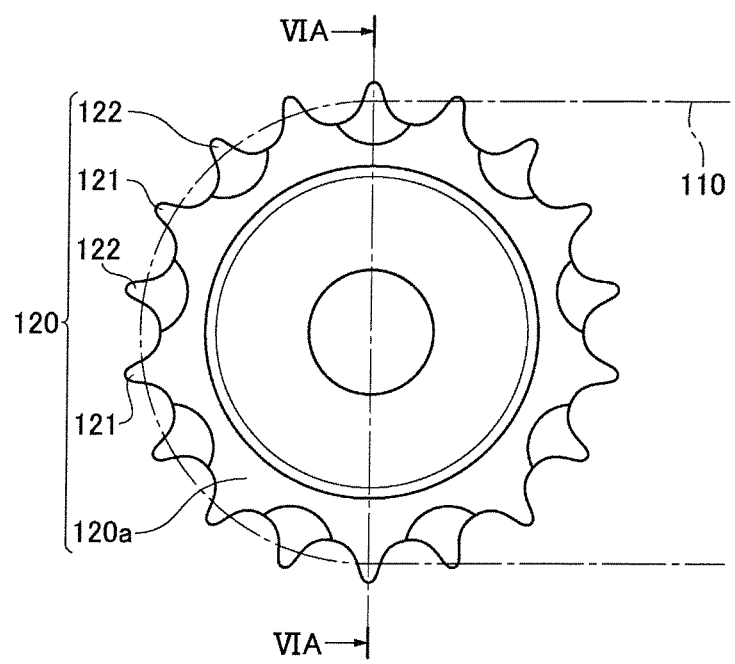
FIG. 3 is a side elevational view of the sprocket shown in FIG. 1.
Figure 4:
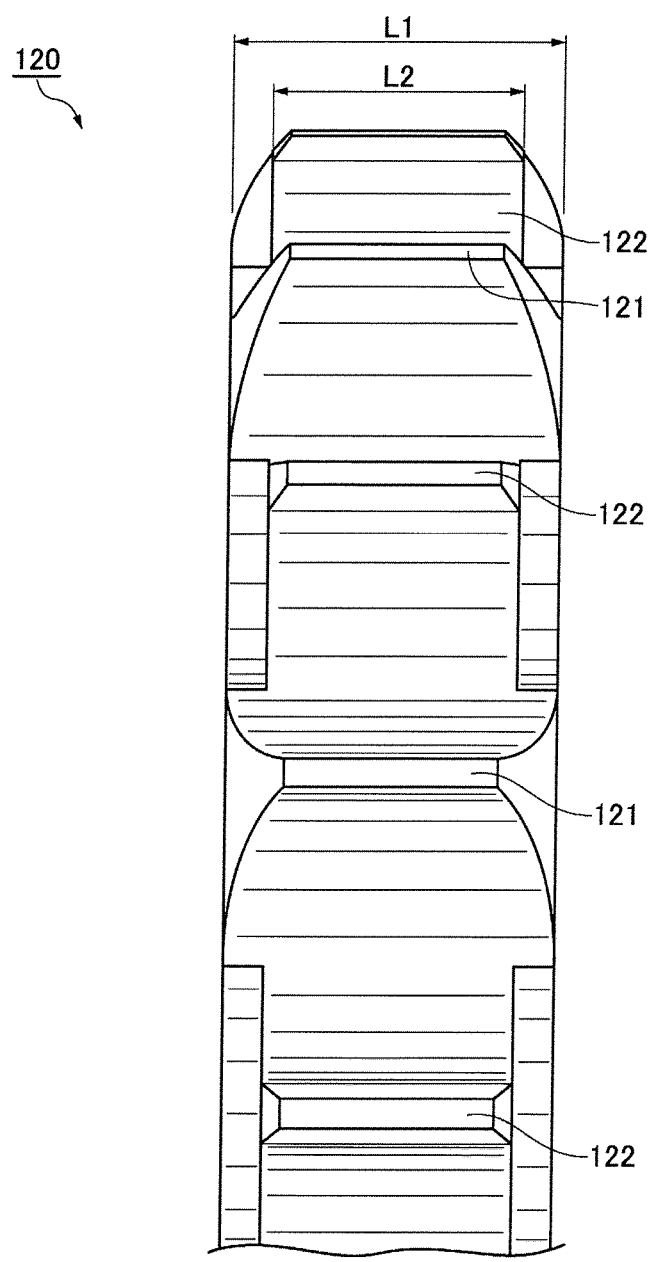
FIG. 4 is an enlargement of a portion of the teeth of the sprocket shown in FIG. 1 as viewed in a direction perpendicular to the axis of rotation of the sprocket.

As shown in FIGS. 3 and 4, the sprocket 120 includes standard sprocket teeth 121 that engage the roller chain 110 and restrict side slip of the chain by reason of a small clearance between the teeth and the inner link plates 111 of the chain.

Figure 5:
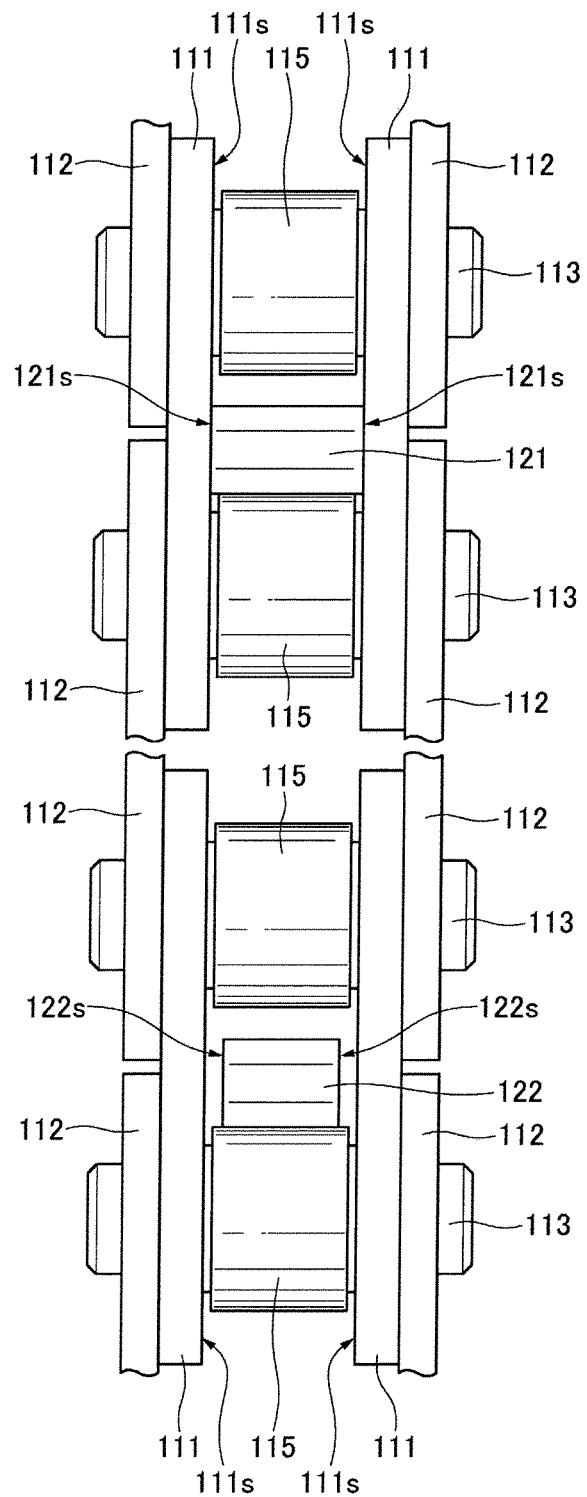
FIG. 5 is an elevational view showing the engagement of a portion of the roller chain with teeth of the sprocket.
Figure 6A:
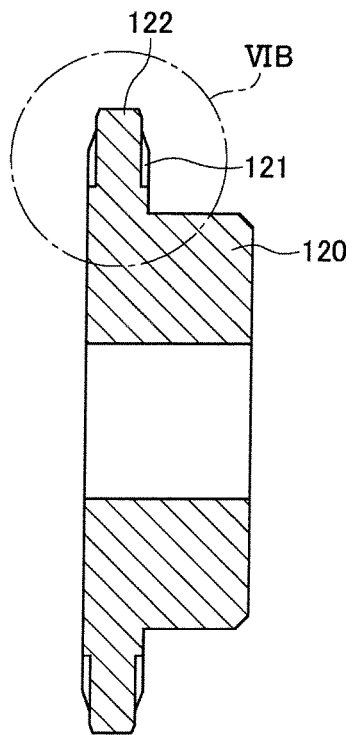
FIG. 6A is cross-sectional view of the sprocket taken on plane VIA-VIA in FIG. 3.
Figure 6B:
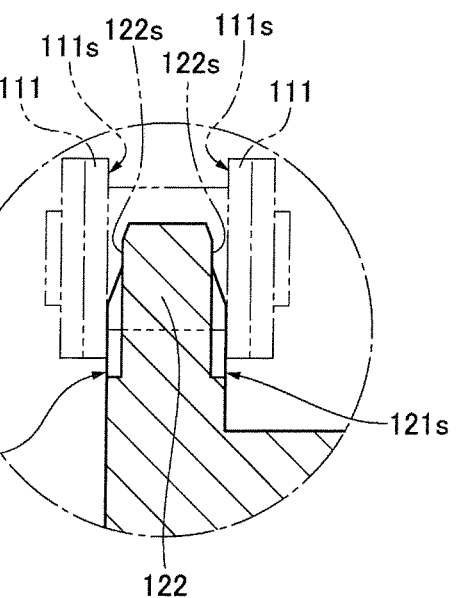
FIG. 6B is an enlargement of a portion of FIG. 6A outlined in a broken line circle labeled VIB, showing the relationship between the sprocket teeth and the inner plates of a roller chain.

As shown in FIG. 5, When the roller chain 110 starts to engage the sprocket 120, the standard sprocket tooth 121 is inserted between inner link plates 111 of the chain, and the outer sides 121s of the standard sprocket tooth 121 contact inner side surfaces 111s of the inner link plates 111 to restrict side slip of the chain.

As shown in FIGS. 3 to 6B, the sprocket 120 also includes narrow sprocket teeth 122, each having a face width L2 (FIG. 4), which is narrower than the face width L1 of the standard sprocket teeth 121. The narrow sprocket teeth engage the rollers 115 of the chain without contacting the inner link plates 111.

Because of the reduced number of standard sprocket teeth on the sprocket, the number of contacts between the outer side surfaces 121s of the standard sprocket teeth 121 and the inner side surfaces 111s of the inner link plates 111 per rotation of the sprocket 120 is reduced by a number corresponding to the number of narrow sprocket teeth 122 on the perimeter of the sprocket.

In this first embodiment, as shown in FIGS. 3 and 4, the standard sprocket teeth 121 and the narrow sprocket teeth 122 are equal in number and arranged in alternating relationship about the perimeter of the sprocket. Thus half of the sprocket teeth are standard sprocket teeth that restrict widthwise deviation of the chain, and the other half of the sprocket teeth are narrow sprocket teeth the outer sides 122s of which do not contact the inner sides 111s of the inner link plates 111.

The roller chain 110 maintains a stable running path, neither sliding in the direction of the chain width nor becoming slanted in the widthwise direction. Because of the reduced number of standard sprocket teeth, contact resistance, i.e., friction, between the sprocket teeth and the inner link plates of the chain is less than in the case of a sprocket in which all of the teeth are standard sprocket teeth having the same face width. Reduction of contact resistance increases the efficiency of operation of the chain transmission and also reduces the frequency and overall magnitude of the periodic sounds generated by contact between the outer surfaces of the standard sprocket teeth and the inner surfaces of the inner link plates.

Figure 7:
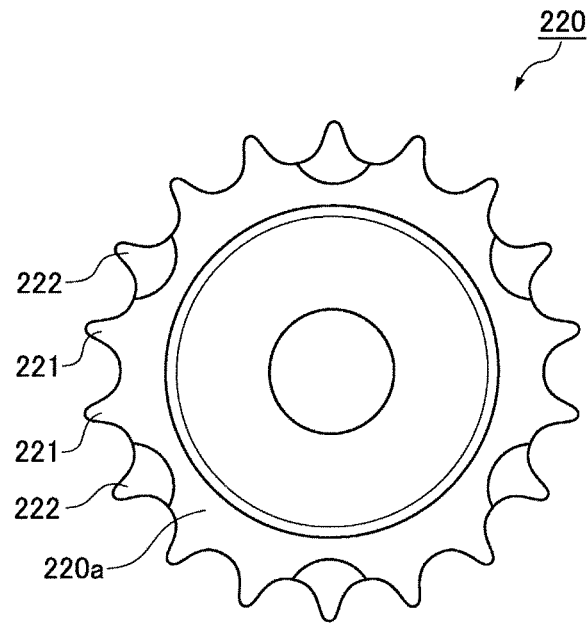
FIG. 7 is a side elevational view of sprocket in accordance with a second embodiment of the invention

In the second embodiment, illustrated in FIG. 7, the chain transmission has basically the same configuration as the chain transmission 100 of the first embodiment, except for the specific configuration of the sprocket. Elements in the second embodiment are identified by reference numeral exceeding by one hundred the reference numerals that identify corresponding elements in the first embodiment.

In the second embodiment, the teeth on the perimeter of sprocket 220 are arranged so that the standard sprocket teeth 221 are disposed in pairs. In each pair, one standard sprocket tooth immediately follows another standard sprocket tooth. A single narrow sprocket tooth 222 is disposed between every two successive pairs of standard sprocket teeth, so that the teeth are arranged in an alternating order in which every pair of adjacent standard sprocket teeth is followed by a single narrow sprocket tooth.

With this arrangement, two-thirds of the sprocket teeth disposed on the perimeter portion 220a of the sprocket 220 are standard sprocket teeth 221, and restrict widthwise deviation of the chain, and the remaining one-third of the sprocket teeth are narrow sprocket teeth 222, the outer side surfaces of which do not contact the inner side surfaces of the inner link plates of a transmission chain in mesh with the sprocket.

The chain according to the second embodiment also exhibits reduced contact resistance, maintains a stable chain path, and reduces by one third the number of contacts between the standard sprocket teeth and the inner link plates of a chain. The magnitude of the frequency components of the periodic sounds and the overall magnitude of the generated sounds is also reduced.

Figure 8:
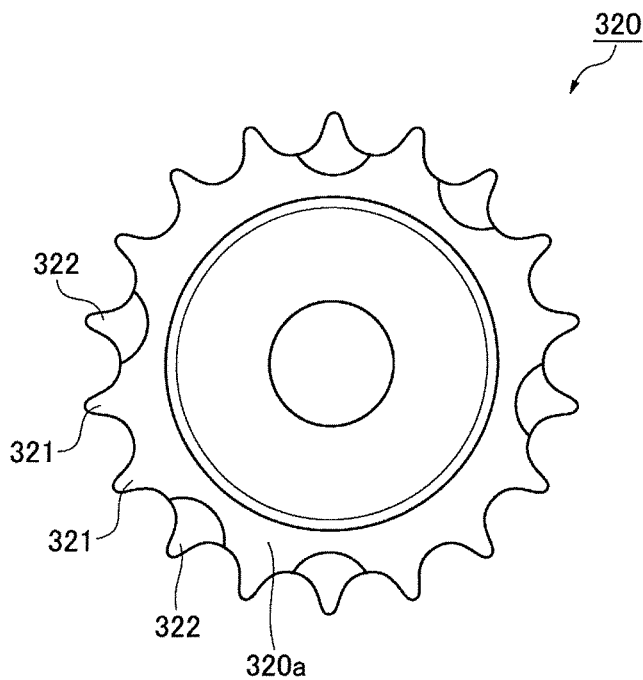
FIG. 8 is a side elevational view of sprocket in accordance with a third embodiment of the invention.
Figure 9:
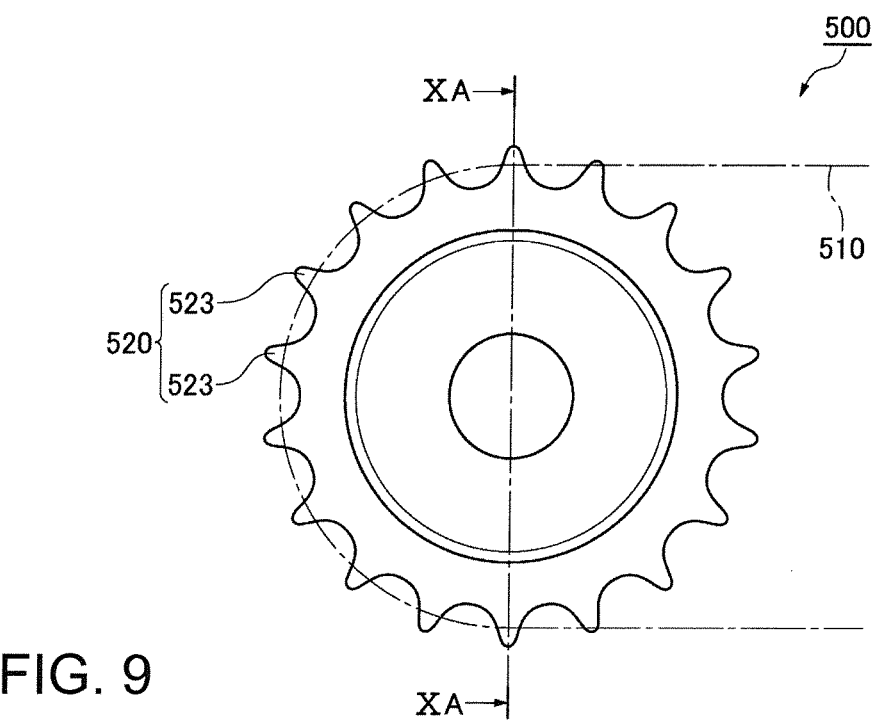
FIG. 9 is a side elevational view of a conventional sprocket.
Figure 10A:
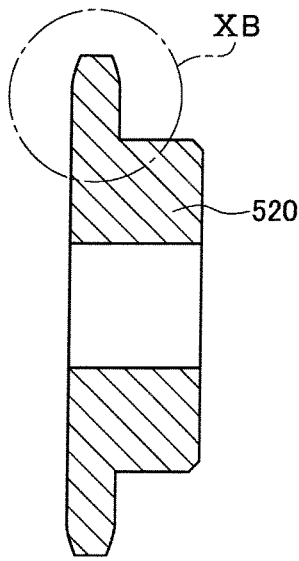
FIG. 10A is cross-sectional view taken on plane XA-XA in FIG. 9.
Figure 10B:
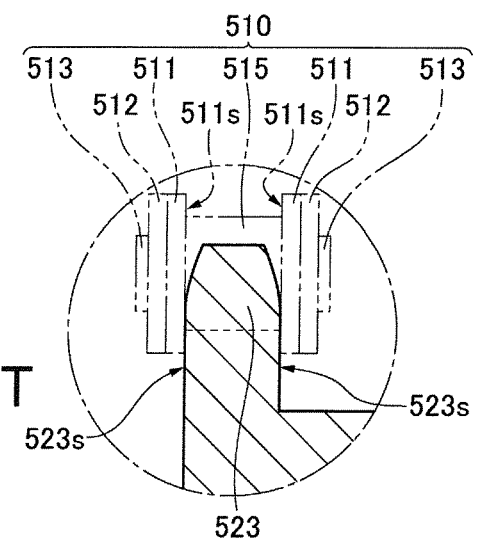
FIG. 10B is an enlargement of a portion of FIG. 10 outlined in a broken line circle labeled XB, showing the relationship between the sprocket teeth of a conventional sprocket and the inner plates of a roller chain.

The chain transmission according to the third embodiment, shown in FIG. 8, also has basically the same configuration as the chain transmission 100 of the first embodiment, except for the specific configuration of the sprocket. Elements in the third embodiment are identified by reference numeral exceeding by two hundred the reference numerals that identify corresponding elements in the first embodiment.

As shown in FIG. 8, standard sprocket teeth 321 and narrow sprocket teeth 322 are disposed in a random order on the perimeter portion 320*a* of sprocket 320. As shown the standard sprocket teeth are arranged as individual teeth and in groups of two or three successive teeth. The narrow teeth can be, but are not necessarily, arranged as individual teeth.

With this arrangement, some of the sprocket teeth are standard teeth 321, that restrict widthwise deviation of the chain, which easily occurs on a chain 310, while other teeth are narrow sprocket teeth 322, the outer sides of which do not contact the inner sides of the inner link plates of the chain. The timing of contact between the outer sides of the standard teeth and the inner sides of the inner link plates is randomly distributed.

The transmission of the third embodiment exhibits effects similar to those of the first and second embodiments, and, in addition, disperses the frequency components of the sound caused by contact between the standard sprocket teeth and the inner link plates so that no single component has a large magnitude.

While three embodiments of the sprocket are described, the standard and narrow sprocket teeth can be arranged in various other orders, numbers, and relative numbers, while still affording the advantages of the invention including noise reduction, reduction of contact resistance, and stable chain travel.

Advantages of the invention can be realized in transmissions using rollerless bushing chains as well as roller chains, and can even be realized in transmissions incorporating other kinds of chains such as silent chains in which guide plates are contacted by the outer side surfaces of sprocket teeth to maintain a stable chain path.

What is claimed is:

1. A chain transmission, comprising:
   a chain comprising pairs of opposed inner link plates and pairs of opposed outer link plates, connecting pins connecting said pairs of link plates in an alternating, overlapping relationship, and a set of sprocket tooth-engaging elements, each surrounding one of said connecting pins, wherein the link plates of each pair of opposed link plates are spaced from each other by an inner link plate spacing distance that is uniform for all the pairs of opposed inner link plates of the chain; and
   at least one driven sprocket engaged with said chain and at least one driving sprocket engaged with said chain, each of said sprockets having a perimeter and an axis of rotation;
   wherein at least one of said sprockets comprises:
   a set of standard sprocket teeth arranged on the perimeter of said at least one of said sprockets, each of said standard sprocket teeth having opposite side faces both disposed substantially in planes to which the axis of rotation of said at least one sprocket is perpendicular, said standard sprocket teeth having a uniform first face width, measured between said opposite side faces in a direction parallel to the axis of rotation of said at least one of said sprockets, said first face width being smaller than said inner link plate spacing distance and each of said standard sprocket teeth being capable of entry between opposed, spaced, inner link plates of said chain and engaging sprocket tooth-engaging elements of said chain while restricting side slip of the chain by contact between said side faces of the standard sprocket teeth and said inner link plates; and
   a set of narrow sprocket teeth also arranged on the perimeter of said at least one of said sprockets, said narrow sprocket teeth also being capable of engaging sprocket tooth-engaging elements of said chain, each of said narrow sprocket teeth having a opposite side faces and a second face width measured between its said opposite side faces in a direction parallel to the axis of rotation of said at least one of said sprockets, said second face width of each of said narrow sprocket teeth being narrower than said first face width of said standard sprocket teeth;
   the opposite side faces of said narrow sprocket teeth being disposed between said planes in which the opposite side faces of the standard sprocket teeth are disposed, whereby, when the narrow sprocket teeth engage sprocket tooth-engaging elements of said chain, contact between the opposite side faces of said narrow sprocket teeth and the inner link plates of the chain is prevented by the restriction of side slip of the chain resulting from contact between said side faces of the standard sprocket teeth and said inner link plates of the chain.

2. The chain transmission according to claim 1, wherein the standard sprocket teeth and the narrow sprocket teeth are disposed in an alternating pattern on the perimeter of said at least one of said sprockets.

3. The chain transmission according to claim 1, wherein adjacent pairs of said standard sprocket teeth are disposed in an alternating pattern with individual narrow sprocket teeth on the perimeter of said at least one of said sprockets.

4. The chain transmission according to claim 1, wherein the standard sprocket teeth and the narrow sprocket teeth are disposed in a random pattern on the perimeter of said at least one of said sprockets.

5. A chain transmission, comprising:
   a chain comprising pairs of opposed inner link plates and pairs of opposed outer link plates, said pairs of link plates being articulably connected in an alternating, overlapping relationship, and a set of sprocket tooth-engaging elements, wherein the link plates of each pair of opposed link plates having inner surfaces facing each other and spaced from each other by an inner link plate spacing distance that is uniform for all the pairs of opposed inner link plates of the chain; and
   at least one driven sprocket engaged with said chain and at least one driving sprocket engaged with said chain, each of said sprockets having a perimeter and an axis of rotation;
   wherein at least one of said sprockets comprises:
   a set of uniform standard sprocket teeth arranged on the perimeter of said at least one of said sprockets, said standard sprocket teeth being capable of engaging sprocket tooth-engaging elements of said chain, and each of said standard sprocket teeth having opposite sides facing in directions parallel to the axis of rotation of said at least one of said sprockets, said opposite sides being spaced from each other by a distance less than said inner link plate spacing distance and being engageable with adjacent inner surfaces of said inner link plates of said chain to restrict side slip of the chain; and
   a set of uniform narrow sprocket teeth also arranged on the perimeter of said at least one of said sprockets, said narrow sprocket teeth also being capable of engaging sprocket tooth-engaging elements of said chain, each of said narrow sprocket teeth being narrower than each of said standard sprocket teeth in a direction parallel to the axis of rotation of said at least one of said sprockets, and each of said narrow sprocket teeth having opposite sides facing in directions parallel to said axis of rotation;

wherein at least one of said standard sprocket teeth is disposed adjacent one of said narrow sprocket teeth on the perimeter of said at least one of said sprockets;

wherein said opposite sides of said narrow sprocket teeth are positioned between, and spaced from, surfaces of revolution traced by said opposite sides of said standard sprocket teeth as said at least one of said sprockets rotates on said axis of rotation, whereby contact of said standard sprocket teeth with inner link plates of said chain prevents said narrow sprocket teeth from contacting said inner link plates of said chain.

6. The chain transmission according to claim 5, wherein the standard sprocket teeth and the narrow sprocket teeth are disposed in an alternating pattern on the perimeter of said at least one of said sprockets.

7. The chain transmission according to claim 5, wherein adjacent pairs of said standard sprocket teeth are disposed in an alternating pattern with individual narrow sprocket teeth on the perimeter of said at least one of said sprockets.

8. The chain transmission according to claim 5, wherein the standard sprocket teeth and the narrow sprocket teeth are disposed in a random pattern on the perimeter of said at least one of said sprockets.

\* \* \* \* \*